US011236630B2

(12) United States Patent
Hosaka et al.

(10) Patent No.: US 11,236,630 B2
(45) Date of Patent: Feb. 1, 2022

(54) AXIAL COMPRESSOR (71) Applicant: IHI Corporation, Koto-ku (JP)

(72) Inventors: Haruki Hosaka, Tokyo (JP); Nozomi Tanaka, Tokyo (JP); Ryuuta Tanaka, Tokyo (JP); Takayuki Hazu, Tokyo (JP); Dai Kato, Tokyo (JP); Daisuke Sato, Tokyo (JP)

(73) Assignee: IHI Corporation, Koto-ku (JP)

( * ) Notice: Subject to any disclaimer, the term of this patent is extended or adjusted under 35 U.S.C. 154(b) by 31 days.

(21) Appl. No.: 16/903,651

(22) Filed: Jun. 17, 2020

(65) Prior Publication Data
US 2020/0308974 A1    Oct. 1, 2020

Related U.S. Application Data (63) Continuation of application No. PCT/JP2018/037724, filed on Oct. 10, 2018.

(30) Foreign Application Priority Data

Dec. 21, 2017 (JP) .............. JP2017-245080

(51) Int. Cl.
F01D 11/10 (2006.01)
F02C 7/042 (2006.01)
(Continued)

(52) U.S. Cl.
CPC .............. F01D 11/10 (2013.01); F02C 7/042 (2013.01); F02C 9/20 (2013.01); F23R 3/04 (2013.01);
(Continued)

(58) Field of Classification Search
CPC . F01D 11/10; F05D 2240/125; F05D 2240/55
See application file for complete search history.

(56) References Cited

U.S. PATENT DOCUMENTS 7,819,626 B2    10/2010    Lee et al.
8,096,756 B2    1/2012     Vo
(Continued)

FOREIGN PATENT DOCUMENTS

FR    3 010 464 A1    3/2015
JP    2000-345997 A   12/2000
(Continued)

OTHER PUBLICATIONS

International Search Report dated Dec. 25, 2018 in PCT/JP2018/037724 filed Oct. 10, 2018, 1 page.
(Continued)

Primary Examiner — Woody A Lee, Jr.
Assistant Examiner — Brian O Peters
(74) Attorney, Agent, or Firm — Oblon, McClelland, Maier & Neustadt, L.L.P.

(57) ABSTRACT

An axial compressor includes: a casing having a tubular shape; variable stator vanes each having a vane shaft as a swing center, provided in the casing as stator vanes or inlet guide vanes, and arranged in a circumferential direction of the casing; rotor blades provided on a trailing edges side of the variable stator vanes in the casing and arranged in the circumferential direction of the casing; and a plasma actuator configured to generate a plasma annularly distributed in the circumferential direction of the casing, the plasma actuator being attached on an inner circumferential surface of the casing and intersects with a clearance between each variable stator vane and the inner circumferential surface of the casing.

10 Claims, 6 Drawing Sheets (51) Int. Cl.
  *F02C 9/20* (2006.01)
  *F23R 3/04* (2006.01)
(52) U.S. Cl.
  CPC ...... *F05D 2240/12* (2013.01); *F05D 2240/55* (2013.01)

(56) References Cited

U.S. PATENT DOCUMENTS

| 8,317,457 | B2 | 11/2012 | Wadia et al. |
| 2009/0169356 | A1 | 7/2009 | Wadia et al. |
| 2011/0236182 | A1 | 9/2011 | Wiebe et al. |
| 2012/0195736 | A1 | 8/2012 | Jothiprasad et al. |
| 2015/0267727 | A1 | 9/2015 | Segawa et al. |

FOREIGN PATENT DOCUMENTS

| JP | 2010-1821 A | 1/2010 |
| JP | 2011-508154 A | 3/2011 |
| JP | 2011-508157 A | 3/2011 |
| JP | 2011-508847 A | 3/2011 |
| JP | 2012-159076 A | 8/2012 |
| JP | 2014-103094 A | 6/2014 |
| JP | 2017-53261 A | 3/2017 |
| WO | WO 2009/108237 A1 | 9/2009 |

OTHER PUBLICATIONS

Saddoughi, S. et al., "Experimental Investigation of Tip Clearance Flow in a Transonic Compressor With and Without Plasma Actuators," Proceeding of ASME Turbo Expo 2014: Turbine Technical Conference and Exposition, Paper No. GT2014, Jun. 16-20, 2014, 14 pages.

Vo, H. D., "Suppression of Short Length-Scale Rotating Stall Inception With Glow Discharge Actuation," Proceeding of GT2007 ASME Turbo Expo 2007: Power for Land, Sea and Air, Paper No. GT2007-27673, May 14-17, 2007, 12 pages.

Asaumi, N. et al., "Multi-Electrode Plasma Actuator to Improve Performance of Flow Separation Control," Proceedings of International Gas Turbine Congress 2015 Tokyo, Nov. 15-20, 2015, 6 pages.

Extended European Search Report dated Jul. 30, 2021 in European Patent Application No. 18892377.5, 7 pages.

AXIAL COMPRESSOR

CROSS REFERENCE TO RELATED APPLICATIONS

This application is a continuation application of International Application No. PCT/JP2018/037724, now WO2019/123787, filed on Oct. 10, 2018, which claims priority to Japanese Patent Application No. 2017-245080, filed on Dec. 21, 2017, the entire contents of which are incorporated by reference herein.

BACKGROUND

1. Technical Field

The present disclosure relates to an axial compressor installed in a gas turbine engine.

2. Description of the Related Art

An axial compressor, which is a type of axial flow machine, includes a vane cascade and a blade cascade which are arranged alternately along a center axis of a rotor (disk, or drum). Each stator vane of the vane cascade is fixed to a casing forming a flow passage of the working fluid. On the other hand, each rotor blade of the rotor blade train is fixed to the rotor and rotates together with the rotor.

A variable stator vane (VSV: Variable Stator Vane) is a stator vane which is swingably provided in the vane cascade. A swing angle of the variable stator vane is set to an optimum value depending on various conditions such as the operating condition of the engine, the temperature of the working fluid and the like. For example, the variable stator vane is controlled to reduce an opening degree of the vane cascade in a condition such as a stating of the engine where a rotational speed of the rotor blade provided at the rear stage of the variable stator vane is significantly lower than a designed rotational speed and thus a stall is likely to occur at the rotor blade. With this, an absolute velocity of the working fluid is increased to suppress an excessive increase in the angle of attack, and the occurrence or expansion of the stall such as rotating stall is avoided (see Japanese Patent Application Laid-Open Application No. 2010-001821).

In recent years, a plasma actuator has attracted attention as a device for controlling a flow of the working fluid in the vicinity of a surface of the casing of the axial compressor (see Japanese Patent Application Laid-Open Application Nos. 2017-053261 and 2011-508157, and U.S. Pat. Nos. 7,819,626, 8,096,756, and 8,317,457).

SUMMARY

A clearance is formed between an airfoil body of the variable stator vane and the casing to allow the variable stator vane to swing. Therefore, part of the working fluid leaks from the pressure side of the airfoil body to the suction side of the airfoil body through the clearance. A vortex (swirl) generated with this leakage increases losses in the variable stator vane.

Accordingly, it is an object of the present disclosure to suppress losses caused by a clearance between an airfoil body of a variable stator vane and a casing in an axial compressor having the variable stator vane.

An aspect of the present disclosure is an axial compressor including: a casing having a tubular shape; variable stator vanes each having a vane shaft as a swing center, provided in the casing as stator vanes or inlet guide vanes, and arranged in a circumferential direction of the casing; rotor blades provided on a trailing edges side of the variable stator vanes in the casing and arranged in the circumferential direction of the casing; and a plasma actuator configured to generate a plasma annularly distributed in the circumferential direction of the casing, the plasma actuator being attached on an inner circumferential surface of the casing and intersects with a clearance between each variable stator vane and the inner circumferential surface of the casing.

The plasma actuator may be divided into plural segments each corresponding a respective one of the variable stator vanes.

The plasma actuator may be attached to the inner circumferential surface of the casing between a row of the vane shafts of the variable stator vanes and a cascade of the rotor blades.

The plasma actuator may be located in a first region between the vane shafts and trailing edges of the variable stator vanes in a fully-closed state in an axial direction of the casing.

The plasma actuator may further be located in a second region between the trailing edges of the variable stator vanes in the fully-closed state and the trailing edges of the variable stator vanes in a fully-opened state in the axial direction of the casing.

A generation of the plasma in the second region by the plasma actuator may be controlled depending on an opening degree of the variable stator vanes.

Each segment of the plasma actuator may extend in a direction that intersects with a chord direction of the corresponding one of the variable stator vanes.

The plasma actuator may be configured to generate the plasma when the variable stator vanes are in a half-open state.

The plasma actuator may be configured to generate the plasma when a sign of stall by the rotor blades is detected.

According to the present disclosure, it is possible to suppress losses caused by a clearance between an airfoil body of a variable stator vane and a casing in an axial compressor having the variable stator vane.

BRIEF DESCRIPTION OF THE DRAWINGS

FIGS. 3A and 3B are views illustrating a configuration of a plasma actuator according to an embodiment of the present disclosure.

DESCRIPTION OF THE EMBODIMENTS

Hereinafter, an axial compressor according to an embodiment of the present disclosure will be described with reference to the drawings. The axial compressor according to the present embodiment is installed in a gas turbine engine. The gas turbine engine is, for example, a turbojet engine, a turbofan engine, a turboprop engine, etc. The gas turbine engine is not limited to the one for an aircraft, and is applicable to, for example, a gas turbine engine for a ship or a power generation. For convenience of explanation, a turbofan engine will be described as an example of a gas turbine engine equipped with an axial compressor. Further, a turbofan engine is simply referred to as an "engine", and an axial compressor is simply referred to as a "compressor".

First Embodiment

Figure 1:
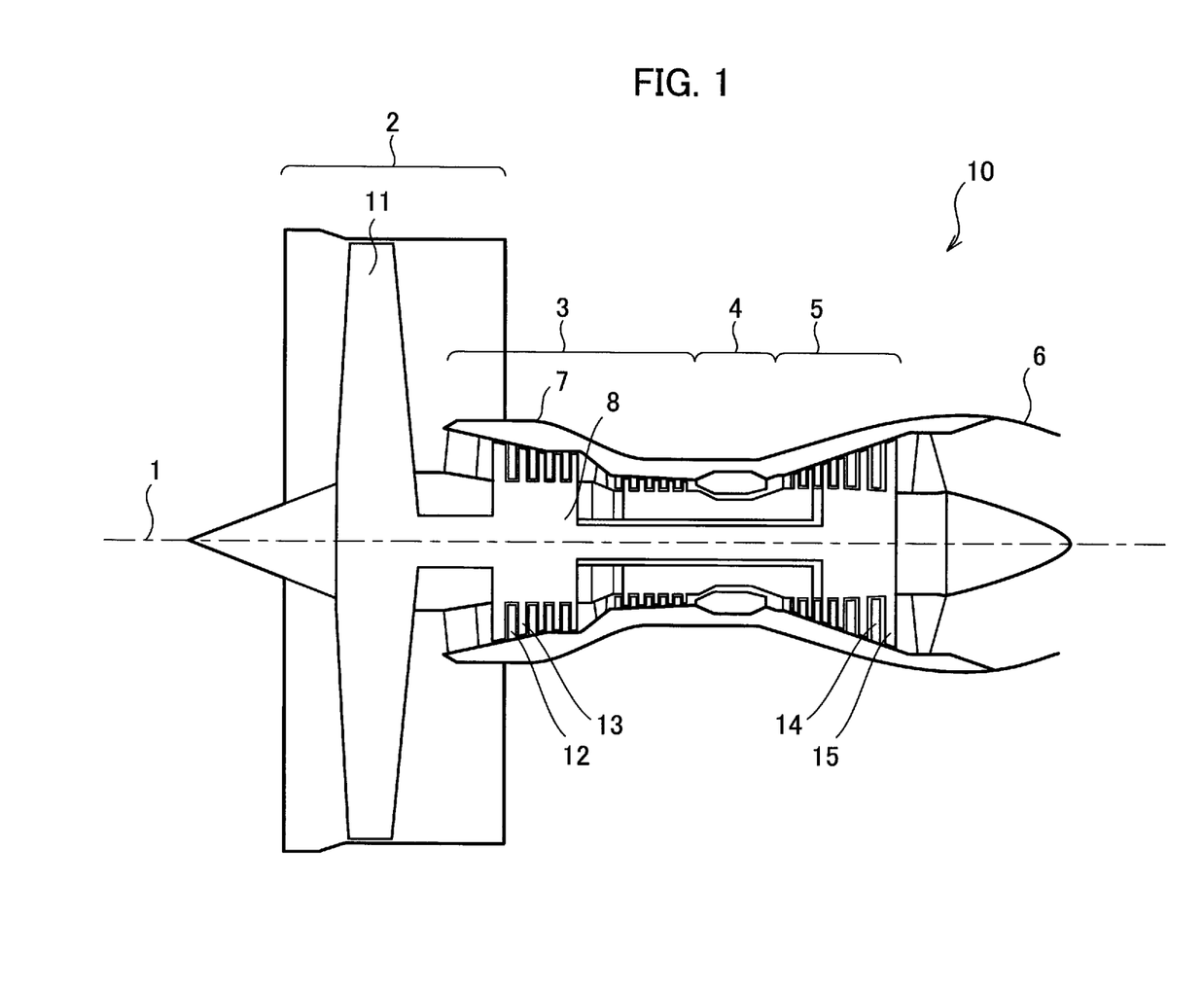
FIG. 1 is a schematic sectional view illustrating a turbofan engine according to an embodiment of the present disclosure.

FIG. 1 is a view illustrating a configuration of an engine including an axial compressor according to the present embodiment. As shown in this figure, the engine 10 includes: a fan 2, a compressor 3, a combustion chamber 4, and a turbine 5. These components are housed in a casing 7 formed in a tubular (hollow cylindrical) shape around an axis 1, and are arranged in a main flow of a working fluid (i.e. air and combustion gases) from a upstream side (left side of FIG. 1) to a downstream side (right side of FIG. 1). The engine 10 may be a single-spool engine including a single pair of the compressor 3 and the turbine 5. Otherwise, the engine 10 may be a multi-spool engine including plural pairs of the compressors 3 and the turbines 5 according to pressures.

The fan 2 includes fan blades 11 radially provided around the axis 1 as the center. The fan 2 guides air as working fluid into the casing 7 from the outside of the engine 10, and supplies part of the air into the compressor 3. The remained part of the air passes through the fan 2 and is discharged to the atmosphere.

The compressor 3 includes stator vanes 12 and rotor blades 13 radially provided in the casing 7 around the axis 1 as the center. The compressor 3 compresses air supplied from an inlet of the engine, and supplies the compressed air to the combustion chamber 4. The stator vane 12 is a so-called variable stator vane which is swingably provided in the compressor 3. Hereinafter, the stator vane(s) 12 will be referred to as the variable stator vane(s) 12. The variable stator vanes 12 and the rotor blades 13 are arranged in the circumferential direction (CD) of the casing 7. A cascade of the variable stator vanes 12 and a cascade of the rotor blades 13 are alternately arranged along the axis 1. Details of the compressor 3 will be described later.

A fuel supply system (not shown) is connected to the combustion chamber 4. The combustion chamber 4 includes an ignition device (not shown). The combustion chamber 4 mixes fuel with air compressed by the compressor 3, and combusts the mixed gas. A combustion gas thus generated is discharged to the turbine 5.

The turbine 5 includes turbine stator vanes 14 and turbine rotor blades 15 radially provided in the casing 7 around the axis 1 as the center. The turbine stator vanes 14 and the turbine rotor blades 15 are arranged in the circumferential direction of the casing 7. A cascade of the turbine stator vanes 14 and a cascade of the turbine rotor blades 15 are alternately arranged along the axis 1.

The combustion gas discharged from the combustion chamber 4 is accelerated while being expanded when passing through the turbine stator vanes 14, and is ejected to the turbine rotor blades 15. The ejected combustion gas rotates the turbine rotor blades 15. By such a process, the thermal energy of the combustion gas is converted into rotational energy, and the combustion gas is discharged from the engine 10 through the duct 6. The rotational energy converted by the turbine 5 is transmitted to the fan 2 and the compressor 3 through a rotor 8, and fan blades 11 of the fan 2 and the rotor blades 13 of the compressor 3 are rotated around the axis 1 as a rotational center.

Figure 2:
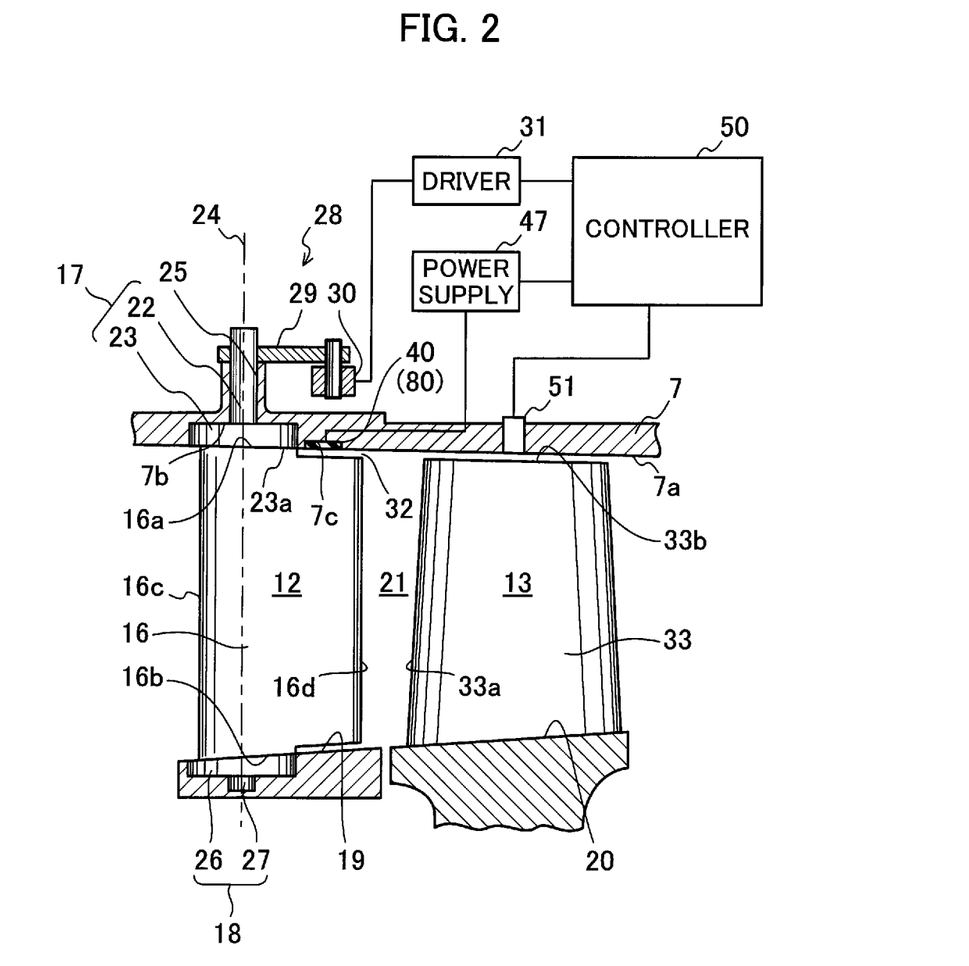
FIG. 2 is a partially enlarged view illustrating an axial compressor according to an embodiment of the present disclosure.

FIG. 2 is a partially enlarged view illustrating the compressor 3 according to the present embodiment. As shown in this figure, the variable stator vane 12 includes an airfoil body 16, and vane shafts (rotary shafts) 17 and 18 as a swing center of the variable stator vane 12. The airfoil body 16 is swingably supported by the casing 7 and the platform 19 through vane shafts 17, 18. In the compressor 3, the casing 7 functions as an outer wall (i.e. a shroud.) of the annular channel 21 through which the working fluid flows. The platform 19 of the variable stator vane 12 and the platform 20 of the rotor blade 13 function as an inner wall of the annular channel 21.

The vane shaft 17 is provided on a tip 16a side of the airfoil body 16. The vane shaft 17 includes a shaft 22 and a button 23. The shaft 22 is a rod having a circular cross section, and the center axis of the shaft 22 coincides with the swing center axis 24 of the variable stator vane 12 (airfoil body 16). The shaft 22 penetrates through a support hole 25 formed in the casing 7.

The button 23 is provided between the shaft 22 and the airfoil body 16 to connect the shaft 22 with the airfoil body 16. The button 23 is a circular disk which is thinner than a thickness of the casing 7. The button 23 is integrated with a part of the airfoil body 16, whereby supporting the airfoil body 16. The button 23 is embedded in a recessed portion 7b which includes the support hole 25 of the casing 7. The button 23 includes a surface 23a exposed to the annular channel 21. The surface 23a is positioned at substantially the same height as the inner circumferential surface 7a of the casing 7, and is integrated with a part of the tip 16a of the airfoil body 16 facing the surface 23a.

The swing center axis 24 (in other words, the central axis of the vane shaft 17) is positioned at a position closer to the leading edge than a center of the airfoil body 16 in a chord direction of the airfoil body 16. The radius of the button 23 is set to a value equal to or greater than a distance from the swing center axis 24 to a leading edge 16c of the airfoil body 16. As described above, the surface 23a of the button 23 is integrated with the part of the airfoil body 16 facing the surface 23a. Accordingly, the leading edge 16c of the airfoil body 16 may be located on the surface 23a of the button 23 as shown in FIG. 2, and no clearance (gap) may be formed on a leading edge 16c side.

The vane shaft 18 is provided on a hub 16b side of the airfoil body 16. The vane shaft 18 has the same structure as the vane shaft 17. However, although a button 26 of the vane shaft 18 is embedded in the platform 19, a shaft 27 of the vane shaft 18 may not penetrate the platform 19.

A drive mechanism 28 rotates the shaft 22 within a predetermined angular range. For example, as shown in FIG. 2, the drive mechanism 28 includes an arm 29, a drive ring 30, and a driver (motor) 31.

The shaft 22 is connected to a drive ring 30 provided outside the casing 7 through an arm 29. The arm 29 is fixed to the shaft 22 and is pivotably connected to the drive ring 30. The drive ring 30 is an annular member extending in the circumferential direction of the casing 7 outside the casing 7.

The drive ring 30 is rotated in the circumferential direction of the casing 7 by the driver 31. When the drive ring 30 rotates, the arm 29 rotates around the shaft 22. The shaft 22 is rotated in association with the rotation of the arm 29. As the result, the airfoil body 16 is rotated (swung) in the annular channel 21 about the swing center axis 24 as the center. The configuration of the drive mechanism 28 is not limited to that described above as long as it has a function of rotating (swing) the shaft 22 within a desired angle range.

A trailing edge 16d of the airfoil body 16 extends to the downstream side of the annular channel 21 (i.e. toward the rotor blade 13). The trailing edge 16d extend downstream more than the button 23 does. On the other hand, the variable stator vane 12 is swingably supported by the casing 7. Therefore, a clearance is formed between the airfoil body 16 and the inner circumferential surface 7a of the casing 7 for the airfoil body 16 not to interfere with the inner circumferential surface 7a. Specifically, a portion of the tip 16a of the airfoil body 16 which faces the inner circumferential surface 7a of the casing 7 is separated from the inner circumferential surface 7a, and a clearance 32 is formed between the portion and the inner circumferential surface 7a.

The rotor blades 13 are provided on a trailing edges 16d side of the variable stator vanes 12 (in other words, on a downstream side of the cascade of the variable stator vanes 12 in the annular channel 21). The rotor blade 13 includes an airfoil body 33 and a platform 20 for supporting the airfoil body 33. The platform 20 is positioned substantially flush with the platform 19 of the variable stator vane 12, and is supported by the rotor 8 via a shank and a dovetail (see FIG. 1). Alternatively, the rotor blade 13 may be integrated with the rotor 8 (as a so-called brisk). The rotor blade 13 rotates together with the rotor 8 around the axis 1 as the rotational center.

The number of stages of the variable stator vanes 12 is appropriately set depending on the specifications of the compressor 3. The variable stator vanes 12 may be provided as the forefront cascade in the compressor 3. In this case, the variable stator vane 12 functions (serves) as an inlet guide vane.

Hereinafter, a plasma actuator according to a first embodiment of the present disclosure will be described. The compressor 3 includes a plasma actuator 40 according to the first embodiment. A plasma actuator 40 generates a plasma 42 for inducing a jet 41. The plasma actuator 40 is attached to the inner circumferential surface 7a of the casing 7, and is provided extending in the circumferential direction of the casing 7 to form an annular shape. For example, the plasma actuator 40 is located between a row 17r of the vane shafts 17 of the variable stator vanes 12 and a cascade 13r of the rotor blades 13 (see FIG. 4). In other words, the plasma actuator 40 is located in an annular region (zonal region) 52 extending in the circumferential direction of the casing 7 (see FIG. 4). The annular region 52 is in contact with a most-downstream portion 17b of the button 23 of the vane shaft 17 and the leading edges 13a of the rotor blades 13 (airfoil bodies 33). The expression in that the plasma actuator 40 is located within a certain region at least means that the plasma 42 is distributed within the region. Therefore, all of the physical structures such as electrodes, an insulating substrate and the like (described later) may be located in the region.

The plasma actuator 40 may be embedded in a groove 7c formed in the inner circumferential surface 7a of the casing 7. In this case, physical interference with the airfoil body 16 of the variable stator vane 12 can be avoided.

The plasma actuator 40 may be divided into plural segments in the circumferential direction of the casing 7. For example, the plasma actuator 40 may be divided into plural segments according to corresponding one of the variable stator vanes 12. Further, the segments may be spaced apart from each other at predetermined intervals. By dividing the plasma actuator 40 into plural segments, an electric circuit such as a power supply 47 can be connected for each segment or for each group of a predetermined number of segments. Therefore, even if a part of the plurality of segments fails, the operation of the plasma actuator 40 can be continued as long as the operation of the entire plasma actuator 40 is not hindered.

Figure 3A:
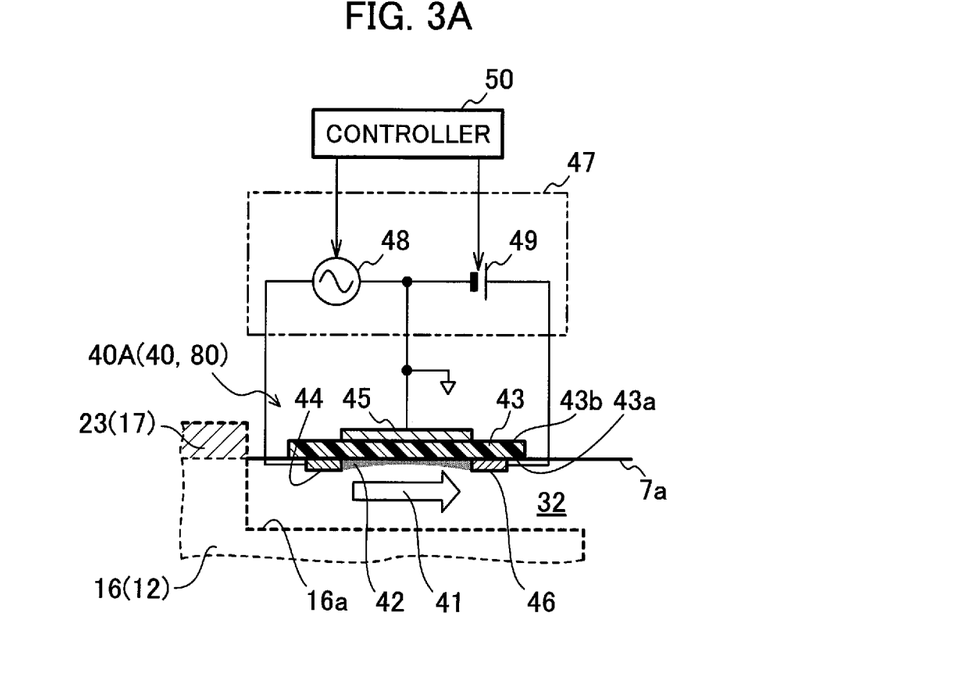
FIG. 3A is a view illustrating the plasma actuator of a three-electrode type.
Figure 3B:
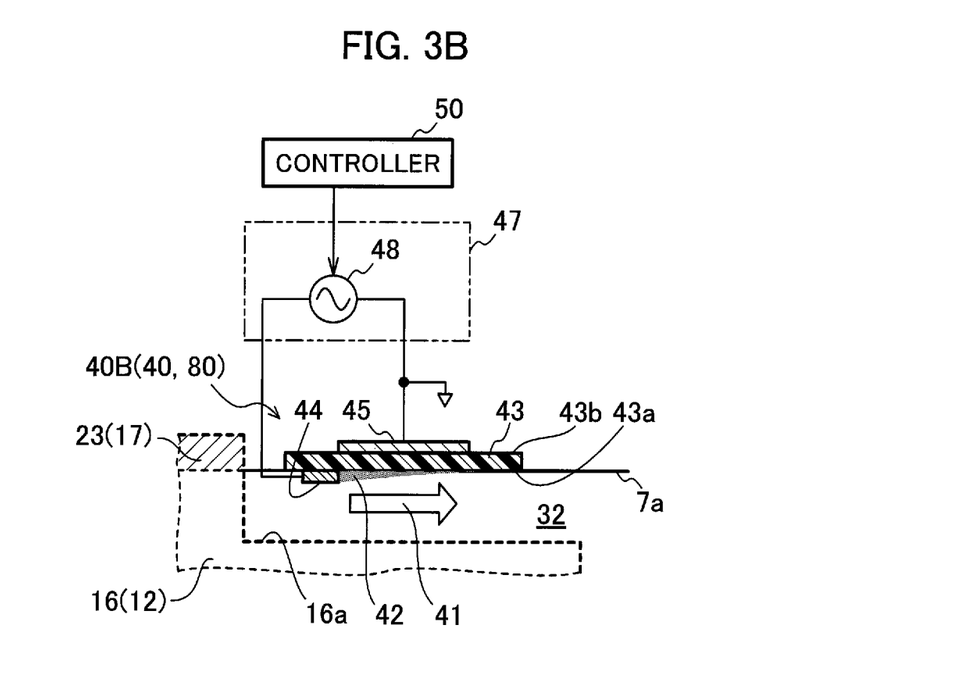
FIG. 3B is a view illustrating the plasma actuator of a two-electrode type.

FIGS. 3A and 3B are views illustrating a configuration of a plasma actuator 40 according to an embodiment of the present disclosure. FIG. 3A is a view illustrating the plasma actuator 40A of a three-electrode type, and FIG. 3B is a view illustrating the plasma actuator 40B of a two-electrode type. As shown in FIG. 3A, the plasma actuator 40A of the three-electrode type includes an insulating substrate (insulating layer) 43, a first electrode 44, a second electrode 45, and a third electrode 46.

The insulating substrate 43 is an annular plate member extending in the circumferential direction. The insulating substrate 43 includes a front surface 43a facing the annular channel 21 and a back surface 43b facing the inner circumferential surface 7a of the casing 7. The insulating substrate 43 is formed of a material having sufficient electrical insulation and mechanical strength, such as ceramic, polyimide resin, or fluororesin. The insulating substrate 43 has a thickness capable of withstanding the dielectric breakdown between the first electrode 44 and the second electrode 45.

Each of the first electrode 44, the second electrode 45, and the third electrode 46 is an annular conductor extending in the circumferential direction of the casing 7. The first electrode 44, the second electrode 45, and the third electrode 46 are arranged in this order from the upstream side to the downstream side of the annular channel 21. Each of the electrodes is provided on the front surface 43a or the back surface 43b of the insulating substrate 43 by etching, plating, or sticking to the insulating substrate 43. However, the shape of any of the electrodes is not limited to a strip (band). For example, each electrode may be made of a conductive wire.

The first electrode 44 is provided on the front surface 43a of the insulating substrate 43, and is exposed to the annular channel 21. The first electrode 44 is located upstream of the second electrode 45 in the annular channel 21, and intersects with the tip 16a of the airfoil body 16 through a clearance. In other words, the first electrode 44 is in a skewed relationship with the tip 16a of the airfoil body 16. A HF (high frequency) power supply 48 of the power supply 47 is connected to the first electrode 44, to apply a high voltage with high frequency to the first electrode 44.

The second electrode 45 is provided on the back surface 43b of the insulating substrate 43, and is located downstream of the first electrode 44 in the annular channel 21. The second electrode 45 is connected to a common of the HF power supply 48 (i.e. a common (ground) of the circuits constituting the plasma actuator 40).

The third electrode 46 is provided on the front surface 43a of the insulating substrate 43, and is exposed to the annular channel 21. The third electrode 46 is located downstream of the second electrode 45 in the annular channel 21. Similarly to the first electrode 44, the third electrode 46 may intersect with the tip 16a of the airfoil body 16 through the clearance 32. Whether or not the third electrode 46 intersects with the tip 16a of the airfoil body 16 depends on the position of the plasma actuator 40. A DC power supply 49 of the power supply 47 is connected to the third electrode 46, and a positive DC voltage with respect to the second electrode 45 is applied to the third electrode 46. The DC voltage is set to several kV, for example.

The power supply 47 includes the afore-mentioned HF power supply 48 and a DC power supply 49. The power supply 47 is controlled by the controller 50, and supplies electric power necessary for generating the plasma 42 to the plasma actuator 40. The HF power supply 48 applies a high frequency voltage between the first electrode 44 and the second electrode 45. The frequency of the high frequency voltage is on the order of several kHz to several tens of kHz, and the voltage is on the order of several kV to several tens of kV. The alternating electric field generated by the HF power supply 48 generates the plasma 42 on the front surface 43a of the insulating substrate 43.

The plasma 42 is annularly distributed in the circumferential direction of the casing 7, and also distributed from the first electrode 44 toward the downstream side of the annular channel 21. The plasma 42 also intersects with the clearance 32. The plasma 42 induces a jet 41 along the front surface 43a of the insulating substrate 43. When the plasma actuator 40 is placed in a windless state, the generated jet 41 flows mainly from the upstream side to the downstream side of the annular channel 21 (i.e. from the variable stator vanes 12 to the rotor blades 13). That is, the plasma 42 induces a flow of a gas around the plasma 42 directed from the upstream side to the downstream side of the annular channel 21.

The DC power supply 49 applies a positive DC voltage with respect to the second electrode 45 to the third electrode 46. An electric field generated by the third electrode 46 extends a generation region of the plasma 42 to the downstream side of the annular channel 21. Therefore, it is possible to increase a momentum of the jet 41 from the upstream side to the downstream side of the annular channel 21.

The power supply 47 is controlled by the controller 50. The controller 50 includes a processing unit (not shown), an input/output unit for receiving information on the rotational speed of the engine 10, and the like. The controller 50 controls the power supply 47 to make the HF power supply 48 and the DC power supply 49 set the voltages and start/stop the application of voltages. In addition, the controller 50 controls the driver 31 to adjust the swing angle of each variable stator vane 12. Here, the controller 50 may also receive an output signal from a pressure sensor 51 disposed in the vicinity of the rotor blade 13 as a criterion for performing these controls.

As shown in FIG. 3B, the plasma actuator according to the present embodiment may be of a two-electrode type. The plasma actuator 40B of the two-electrode type does not have the third electrode 46 of the plasma actuator 40A, and the DC power supply 49 is also unnecessary. Therefore, although the momentum of the obtained jet 41 to be obtained is smaller than that obtained by the plasma actuator 40A having the same size, the configuration can be simplified.

As described above, the clearance 32 is formed between the airfoil body 16 of the variable stator vane 12 and the inner circumferential surface 7a of the casing 7 on the downstream side of the button 23. Therefore, a portion of the working fluid leaks from the pressure side 16e of the airfoil body 16 to the suction side 16f of the airfoil body 16 through the clearance 32. A vortex (swirl) 61 generated along with this leakage 60 comes to increase losses in the variable stator vane 12.

Therefore, in the present embodiment, the plasma actuator 40 generates the plasma 42 so that the aforementioned jet 41 is induced, thereby deflecting the leakage near the plasma 42 toward the rotor blade 13 located on the downstream side. The deflection of the leakage 60 suppresses the generation and growth of the vortex 61. That is, losses caused by the generation and growth of the vortex 61 are suppressed.

Figure 5:
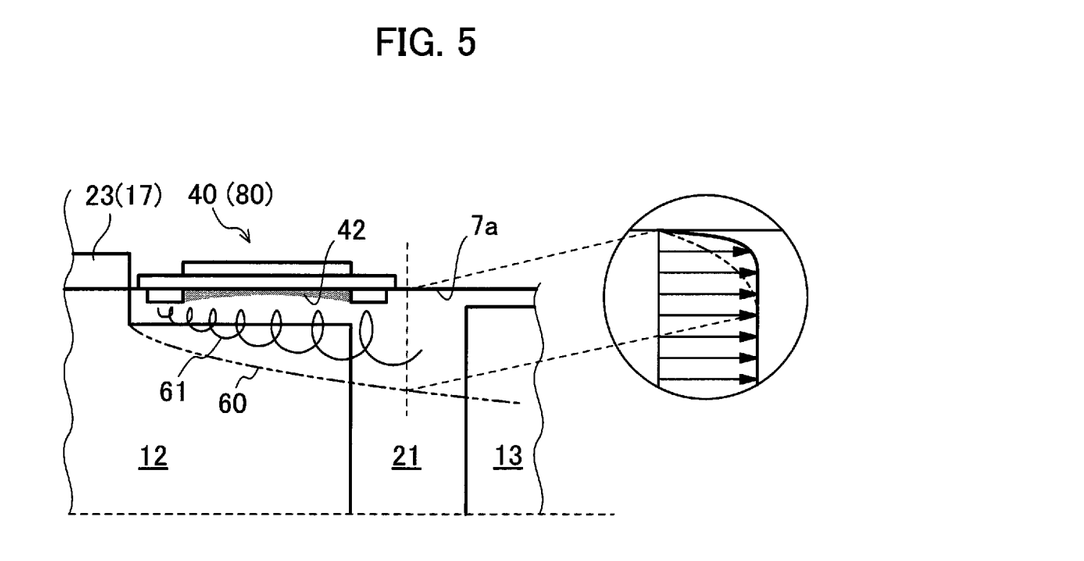
FIG. 5 is a view illustrating an effect of the plasma actuator according to an embodiment of the present disclosure.

The generation and growth of the vortex 61 are suppressed. Such suppression increases the velocity component from the upstream side to the downstream side of the annular channel 21 in the working fluid in the vicinity of the inner circumferential surface 7a (i.e. the boundary layer). Therefore, for example, as shown in the upper right of FIG. 5, the velocity gradient of the working fluid in the vicinity of the inner circumferential surface 7a changes from the curve indicated by the dashed line to the curve indicated by the solid line, and an amount of the working fluid, which is in the vicinity of the inner circumferential surface 7a and has the same velocity component as that of the main flow of the working fluid, is increased. As a result, the inflow angle of the working fluid to the rotor blade 13 in the vicinity of the inner circumferential surface 7a is improved, and the operating range of the rotor blade 13 is expanded. That is, the reduction of the stall margin can be suppressed.

During operation of the engine 10 (compressor 3), losses associated with the leakage 60 always occur to a certain degree. Therefore, the plasma actuator 40 may always generate the plasma 42 while the engine 10 is in operation.

The plasma actuator 40 may generate the plasma 42 only during a state in which losses are concerned, for example. In this case, since the generation time of the plasma 42 relative to the operating time of the engine 10 (compressor 3) is shortened, the lifetime of the plasma actuator 40 can be extended and the power consumption by the plasma actuator 40 can be reduced. The state in which the losses are concerned is a state in which the flow rate of the working fluid is relatively small and a sufficient inflow angle of the working fluid to the rotor blade 13 cannot be obtained, for example, when the engine 10 (compressor 3) is started. Such a state can be judged from the rotational speed of the engine 10.

Figure 4:
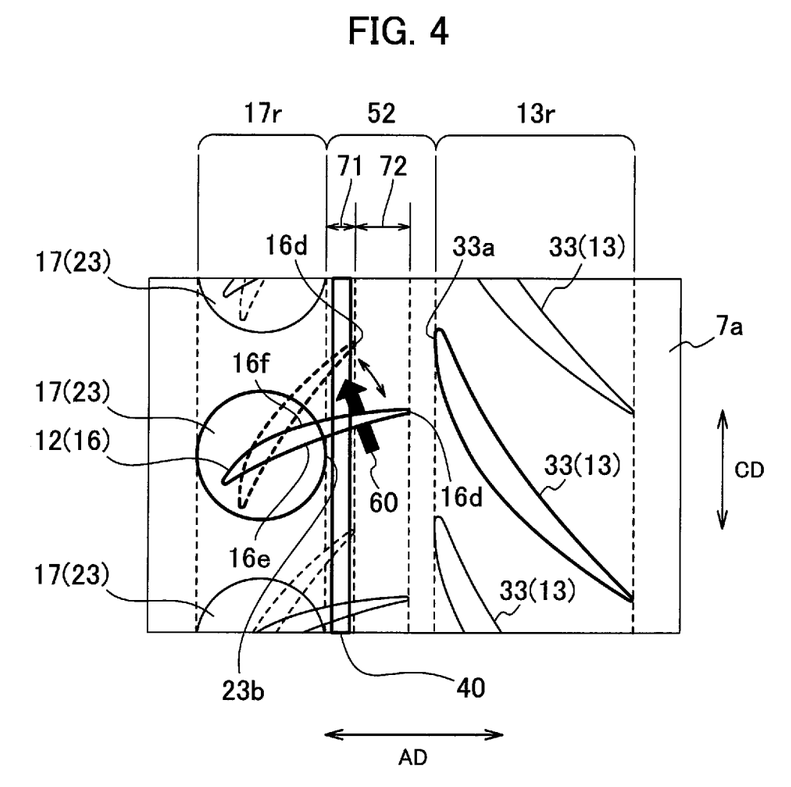
FIG. 4 is a plan (development) view illustrating an example of installation of the plasma actuator according to a first embodiment of the present disclosure.

FIG. 4 is a plan view illustrating an example of installation of the plasma actuator 40 according to the present embodiment. FIG. 4 illustrates the variable stator vanes 12 in the fully-closed state by dotted lines, and the variable stator vanes 12 in the fully open state by solid lines. The term "fully-closed" as used herein means a state in which the variable stator vanes 12 are placed at an angle at which the flow of the working fluid is minimized, in other words, a state in which the opening degree of the variable stator vane 12 is minimized. On the other hand, "fully-opened" means a state opposite to the fully-closed state, that is, a state in which the opening degree of the variable stator vanes 12 is maximized.

As shown in FIG. 4, the plasma actuator 40 may be located in a first region (first section) 71 between the vane shafts 17 and the trailing edges 16d of the variable stator vanes 12 in the fully-closed state in an axial direction (AD) of the casing 7 (in other words, when viewed from the circumferential direction of the casing 7). In a state when the engine 10 (compressor 3) is started or the like, the variable stator vanes 12 are set to the fully-closed state in order to reduce the inflow angle of the working fluid to the rotor blades 13. When the variable stator vanes 12 are in the fully-closed state, each airfoil body 16 (i.e. clearance 32) overlaps the row 17r of the vane shaft 17 most. At this time, a part of the airfoil body 16 including the trailing edge 16d, which does not overlap the row 17r of the vane shaft 17, is located in the first region 71. By attaching the plasma actuator 40 to this first region 71, not only the deflection and the like of the leakage 60 generated in the first region 71 but also the deflection and the like of the leakage 60 on the upstream side thereof can be performed.

The plasma actuator 40 may further be located in a second region (second section) 72 between the trailing edges 16*d* of the variable stator vanes 12 in the fully-closed state and the trailing edges 16*d* of the variable stator vanes 12 in a fully-opened state in the axial direction of the casing 7 (in other words, when viewed from the circumferential direction of the casing 7). In other words, the two plasma actuators 40 may be separately provided in the first region 71 and the second region in parallel with each other along the circumferential direction of the casing 7. In this case, deflection or the like of the leakage 60 can be further promoted.

The plasma actuator 40 may be located only in the second region 72. For example, it is conceivable that the generation and growth of the vortex 61 become remarkable when a part of the airfoil body 16 is located on the second region 72 due to the size and shape of the airfoil body 16. In this case, by positioning the plasma actuator 40 only in the second region 72, it is possible to efficiently suppress losses caused by the generation and growth of the vortex 61 while suppressing the power consumption of the plasma actuator 40.

The generation of the plasma 42 in the second region 72 may be controlled depending on an opening degree of the variable stator vanes 12. For example, the controller 50 generates the plasma 42 of the plasma actuator 40 in the second region 72 only when the airfoil body 16 overlaps the plasma actuator 40. Since the position where the plasma 42 is generated is set according to the opening degree of the variable stator vanes 12, the power consumption can be reduced by appropriately turning off the plasma actuator 40 in the second region 72.

The plasma actuator 40 may generate the plasma 42 when a sign of stall by the rotor blades is detected. In this case, a pressure sensor 51 is provided on the inner circumferential surface 7*a* of the casing 7. For example, as shown in FIG. 2, the pressure sensor 51 is attached to a portion of the inner circumferential surface 7*a* facing the tip 13*b* of the rotor blade (airfoil body 33), and detects the pressure while the rotor blades 13 are rotating. A detection signal of the pressure sensor 51 is sent to the controller 50, and the controller 50 detects a sign of occurrence of a stall based on a prescribed algorithm. When the controller 50 detects a sign of stall generation from a change in pressure detected by a pressure sensor 51, the controller 50 controls the power supply 47 to generate the plasma from the plasma actuator 40. Thus, the deflection of the leakage 60 and the generation and growth of the vortex 61 are suppressed, and the inflow angle of the working fluid to the rotor blades 13 is improved to avoid the occurrence of the stall.

Second Embodiment

A plasma actuator according to a second embodiment of the present disclosure will be described. The plasma actuator according to the second embodiment is divided into plural segments each corresponding a respective one of the variable stator vanes. Further, each segment is separately provided for the variable stator vane 12. Since the other components are the same as those of the first embodiment, a description thereof will be omitted.

Figure 6:
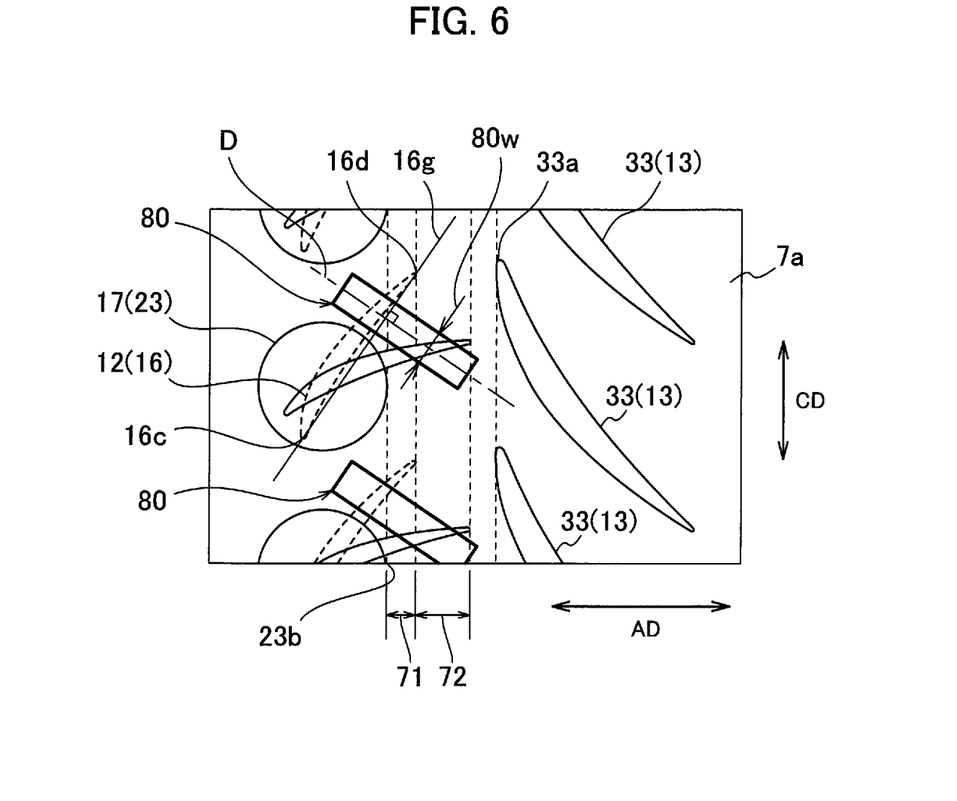
FIG. 6 is a plan (development) view illustrating an example of installation of the plasma actuator according to a second embodiment of the present disclosure.

For convenience of explanation, the segmented plasma actuator according to the second embodiment is represented by the plasma actuator 80. FIG. 6 is a plan (development) view illustrating an example of installation of the plasma actuator according to the present embodiment. Similarly to the first embodiment, the plasma actuator 80 according to the second embodiment also generates the plasma 42 as shown in FIGS. 3A and 3B, and the plasma 42 is distributed in the circumferential direction of the casing 7. However, the plasma actuator 80 is provided separately for each of the variable stator vanes 12.

The plasma actuator 80 has the same configuration as the plasma actuator 40A (see FIG. 3(*a*)) or the plasma actuator 40B (see FIG. 3(*b*)). That is, the plasma actuator 80 includes at least two electrodes sandwiching an insulating substrate.

As shown in FIG. 6, the plasma actuator 80 extends in a direction D that intersects with the chord direction 16 g of the corresponding variable stator vane 12 (airfoil body 16). For example, the direction D is orthogonal to the chord direction 16 g of the variable stator vane 12 in the fully-closed state. Each electrode of the plasma actuator 80 also extends in the direction D. Accordingly the jet 41 induced by the plasma 42 flows along the inner circumferential surface 7*a* of the casing 7 in a direction substantially orthogonal to the direction D. The width 80*w* of the plasma actuator 80 orthogonal to the direction D may be constant or may be gradually changed along the direction D.

The plasma actuator 80 is provided to intersect with the clearance 32 when the variable stator vanes 12 is in the fully-closed state and the clearance 32 when the variable stator vane is in the fully-opened state. The generation timing and duration of the plasma 42 by the plasma actuator 80 are the same as those in the first embodiment. Thus, no matter what state the variable stator vanes 12 is in, it is possible to generate the plasma 42 intersecting with the clearance 32 and to deflect the leakage 60 (see FIG. 5) towards the rotor blade 13 on the downstream side. Also in the second embodiment, the same effect as in the first embodiment can be obtained by deflection of the leakage 60 with the jet 41.

The plasma actuator 80 may generate the plasma 42 when the variable stator vanes 12 are in a half-open state. In other words, the generation of the plasma 42 may be limited only when the variable stator vanes 12 are in the half-open state. Here, the term "half-open" means a state in which the variable stator vanes 12 are placed at a swing angle between a swing angle in the fully-closed state and a swing angle in the fully-opened state. In the stage of the compressor 3 where the variable stator vanes 12 are installed, a stall is likely to be induced when the variable stator vanes 12 are in the half-open state. With the generation of the plasma 42 only in such a state, power consumption of the plasma actuator 80 can be reduced. In addition, from the viewpoint of preventing the occurrence of the stall, the plasma 42 may be generated when the sign of the stall by the rotor blade 13 is detected by using the pressure sensor 51 or the like as in the first embodiment.

The present disclosure describes an embodiment with reference to the drawings. However, the present disclosure is not limited to the embodiment. A person having ordinary skill in the art will be able to conceive various changes and modifications within the scope of the claims and recognize that they are naturally belonged in the technical scope of the present disclosure.

What is claimed is:
1. An axial compressor comprising:
a casing having a tubular shape;
variable stator vanes each having a vane shaft as a swing center, provided in the casing as stator vanes or inlet guide vanes, and arranged in a circumferential direction of the casing;

rotor blades provided on a trailing edges side of the variable stator vanes in the casing and arranged in the circumferential direction of the casing; and a plasma actuator configured to generate a plasma annularly distributed in the circumferential direction of the casing, the plasma actuator being attached on an inner circumferential surface of the casing and intersects with a clearance between each variable stator vane and the inner circumferential surface of the casing; wherein the plasma actuator is located in a first region between the vane shafts and trailing edges of the variable stator vanes in a fully-closed state in an axial direction of the casing and in a second region between the trailing edges of the variable stator vanes in the fully-closed state and the trailing edges of the variable stator vanes in a fully-opened state in the axial direction of the casing, and a generation of the plasma in the second region by the plasma actuator is controlled depending on an opening degree of the variable stator vanes.

2. The axial compressor according to claim 1, wherein the plasma actuator is divided into plural segments each corresponding a respective one of the variable stator vanes.

3. The axial compressor according to claim 1, wherein the plasma actuator is attached to the inner circumferential surface of the casing between a row of the vane shafts of the variable stator vanes and a cascade of the rotor blades.

4. The axial compressor according to claim 2, wherein each segment of the plasma actuator extends in a direction that intersects with a chord direction of the corresponding one of the variable stator vanes.

5. The axial compressor according to claim 4, wherein the plasma actuator is configured to generate the plasma when the variable stator vanes are in a half-open state.

6. The axial compressor according to claim 1, wherein the plasma actuator is configured to generate the plasma when a sign of stall by the rotor blades is detected.

7. The axial compressor according to claim 2, wherein the plasma actuator is configured to generate the plasma when a sign of stall by the rotor blades is detected.

8. The axial compressor according to claim 3, wherein the plasma actuator is configured to generate the plasma when a sign of stall by the rotor blades is detected.

9. The axial compressor according to claim 4, wherein the plasma actuator is configured to generate the plasma when a sign of stall by the rotor blades is detected.

10. The axial compressor according to claim 5, wherein the plasma actuator is configured to generate the plasma when a sign of stall by the rotor blades is detected.

* * * * *